United States Patent [19]

Caputo

[11] Patent Number: 4,515,247

[45] Date of Patent: May 7, 1985

[54] ELEVATOR SYSTEM

[75] Inventor: William R. Caputo, Wyckoff, N.J.

[73] Assignee: Westinghouse Electric Corp., Pittsburgh, Pa.

[21] Appl. No.: 578,338

[22] Filed: Feb. 9, 1984

[51] Int. Cl.$^3$ ............................................ B66B 1/30

[52] U.S. Cl. ............................................ 187/29 R

[58] Field of Search ............................ 187/29 R, 29

[56] References Cited

U.S. PATENT DOCUMENTS

| | | | |
|---|---|---|---|
| 4,034,856 | 7/1977 | Wehrli et al. | 187/29 R |
| 4,128,142 | 12/1978 | Satoh et al. | 187/29 R |
| 4,136,758 | 1/1979 | Tachino | 187/29 R |
| 4,155,426 | 5/1979 | Booker, Jr. | 187/29 R |
| 4,354,577 | 10/1982 | Yonemoto | 187/29 R |

*Primary Examiner*—Bernard Roskoski

*Assistant Examiner*—Paul Shik Luen Ip

*Attorney, Agent, or Firm*—D. R. Lackey

[57] ABSTRACT

An elevator system which generates a landing speed pattern having the advantages of both digital and analog based patterns, without the disadvantages of either, by generating a landing speed pattern which is a digital, i.e., absolute position, and analog composite. The absolute position of the elevator car in the landing zone of a target floor is detected at only a few points on each side of floor level, and an absolute pattern value is stored in memory for each such point. The stored speed pattern values are retrieved as the car arrives at each absolute position point and used for establishing the landing speed pattern, with the last such value being modified to provide a continuous pattern which smoothly blends with the next stored speed pattern value as the elevator car reaches the next absolute position point.

8 Claims, 13 Drawing Figures

| | ROM X(N) SIGN | | | | | | | | POSITION 1 = 1/4 INCH |
|---|---|---|---|---|---|---|---|---|---|
| 0 0 0 | 1 | 0 | 1 | 0 | 1 | 0 | 0 | 0 | -40 (-10") |
| 0 0 1 | 1 | 0 | 0 | 1 | 1 | 0 | 0 | 0 | -24 (-6") |
| 0 1 0 | 1 | 0 | 0 | 0 | 1 | 0 | 0 | 0 | -8 (-2") |
| 0 1 1 | 1 | 0 | 0 | 0 | 0 | 0 | 1 | 0 | -2 (-1/2") |
| 1 0 0 | 0 | 0 | 0 | 0 | 0 | 0 | 1 | 0 | 2 (1/2") |
| 1 0 1 | 0 | 0 | 0 | 0 | 1 | 0 | 0 | 0 | 8 (2") |
| 1 1 0 | 0 | 0 | 0 | 1 | 1 | 0 | 0 | 0 | 24 (6") |
| 1 1 1 | 0 | 0 | 1 | 0 | 1 | 0 | 0 | 0 | 40 (10") |

| | ROM P(N) SIGN | | | | | | | | ANALOG PATTERN VALUE |
|---|---|---|---|---|---|---|---|---|---|
| 0 0 0 | 0 | 1 | 0 | 0 | 0 | 1 | 1 | 0 | 70 |
| 0 0 1 | 0 | 0 | 1 | 1 | 0 | 1 | 0 | 1 | 53 |
| 0 1 0 | 0 | 0 | 0 | 1 | 1 | 0 | 1 | 0 | 26 |
| 0 1 1 | 0 | 0 | 0 | 0 | 0 | 1 | 1 | 1 | 7 |
| 1 0 0 | 1 | 0 | 0 | 0 | 0 | 1 | 1 | 1 | -7 |
| 1 0 1 | 1 | 0 | 0 | 1 | 1 | 0 | 1 | 0 | -26 |
| 1 1 0 | 1 | 0 | 1 | 1 | 0 | 1 | 0 | 1 | -53 |
| 1 1 1 | 1 | 1 | 0 | 0 | 0 | 1 | 1 | 0 | -70 |

| ROM |
|---|
| ΔT |

ELEVATOR SYSTEM

BACKGROUND OF THE INVENTION

1. Field of the Invention

The invention relates in general to elevator systems, and more specifically to new and improved apparatus and methods for generating a landing speed pattern for elevator systems.

2. Description of the Prior Art

A speed pattern for an elevator car is usually time based until the car reaches a distance from the target floor at which it must start the slowdown phase of the run. At this point, a distance based slowdown pattern is usually substituted for the time based pattern. When the distance-to-go value from the elevator car to the target floor is based upon updating a counter with pulse wheel generated distance pulses, or when it is determined by any other method in which the car position is not absolute, it is common to switch to a hatch transducer arrangement, such as shown in U.S. Pat. Nos. 2,874,806; 3,138,223; 3,207,265; and 3,507,360. The hatch transducer provides a continuous analog landing speed pattern which starts, for example, when the elevator car reaches a point 10 inches (25.4 cm) from floor level and continues until the car is stopped level with the floor. The hatch transducer includes a pair of car mounted transformers, associated circuitry, and a metallic specially shaped landing vane at each floor. While excellent landings are made using the hatch transducer, it does require substantial time to initially adjust the landing vane at each floor, in order to produce good landings. Also, being analog, the circuitry is subject to manufacturing tolerances and drift, which causes different landing patterns to be produced at different floors, as well as adversely affecting repeatability. Further, while the hatch transducer was designed to compensate for horizontal car motion, i.e., concentrated car loading, the compensation is only partial and zero position is affected.

A digital landing device can overcome the above-mentioned problems, but it would introduce new problems. The ideal digital device will detect absolute car position over a ±10 inch (25.4 cm) landing zone range, for example, to a resolution of 7 bits. This is difficult and costly to do. The resolution can readily be achieved using an incremental system, but this suffers from not being sure of absolute car position.

SUMMARY OF THE INVENTION

Briefly, the present invention is a new and improved elevator system in which the speed of the elevator car is controlled in response to the difference between actual car speed and a speed pattern. A landing speed pattern for accurately stopping the elevator car at the level of a target floor is generated by detecting the actual absolute position of the car at a few spaced points on either side of floor level, and by storing an absolute speed pattern value for each such position. The correct stored value is retrieved as the elevator car reaches each absolute position point and it is used for the speed pattern at this instant in time. The last such value is then modified to continue the landing speed pattern until the car reaches the next absolute car position point. The modification is determined by multiplying the distance traveled by the elevator car since the last absolute car position point by a predetermined constant. This predetermined constant is equal to the difference between the stored pattern values associated with the last absolute car position point and the next absolute car position point, divided by the distance between these two absolute car position points.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

The invention relates to a new and improved elevator system in which a landing speed pattern is used to accurately stop an elevator car at a target floor. Only those portions of an elevator system which are pertinent to the understanding of the invention will be described, with the remaining portions of a complete exemplary elevator system being incorporated by reference to issued patents assigned to the same assignee as the present application. The patents incorporated by reference are U.S. Pat. Nos. 3,750,850; 4,277,825; and 4,019,606.

U.S. Pat. No. 3,750,850 sets forth a car controller, including a floor selector and speed pattern generator, which utilize distance pulses in their operation. An electrical distance pulse or signal is generated, such as from a pulse wheel, in response to each predetermined standard increment of car travel, such as a distance pulse for each 0.25 inch (0.635 cm) of car travel. U.S. Pat. No. 4,277,825 discloses elevator drive machine control which utilizes a speed pattern to control the speed of an elevator car. U.S. Pat. No. 4,019,606 illustrates an optoelectronic arrangement which may be used to detect a reflective target disposed adjacent to each floor of a building.

Figures 1, 2:
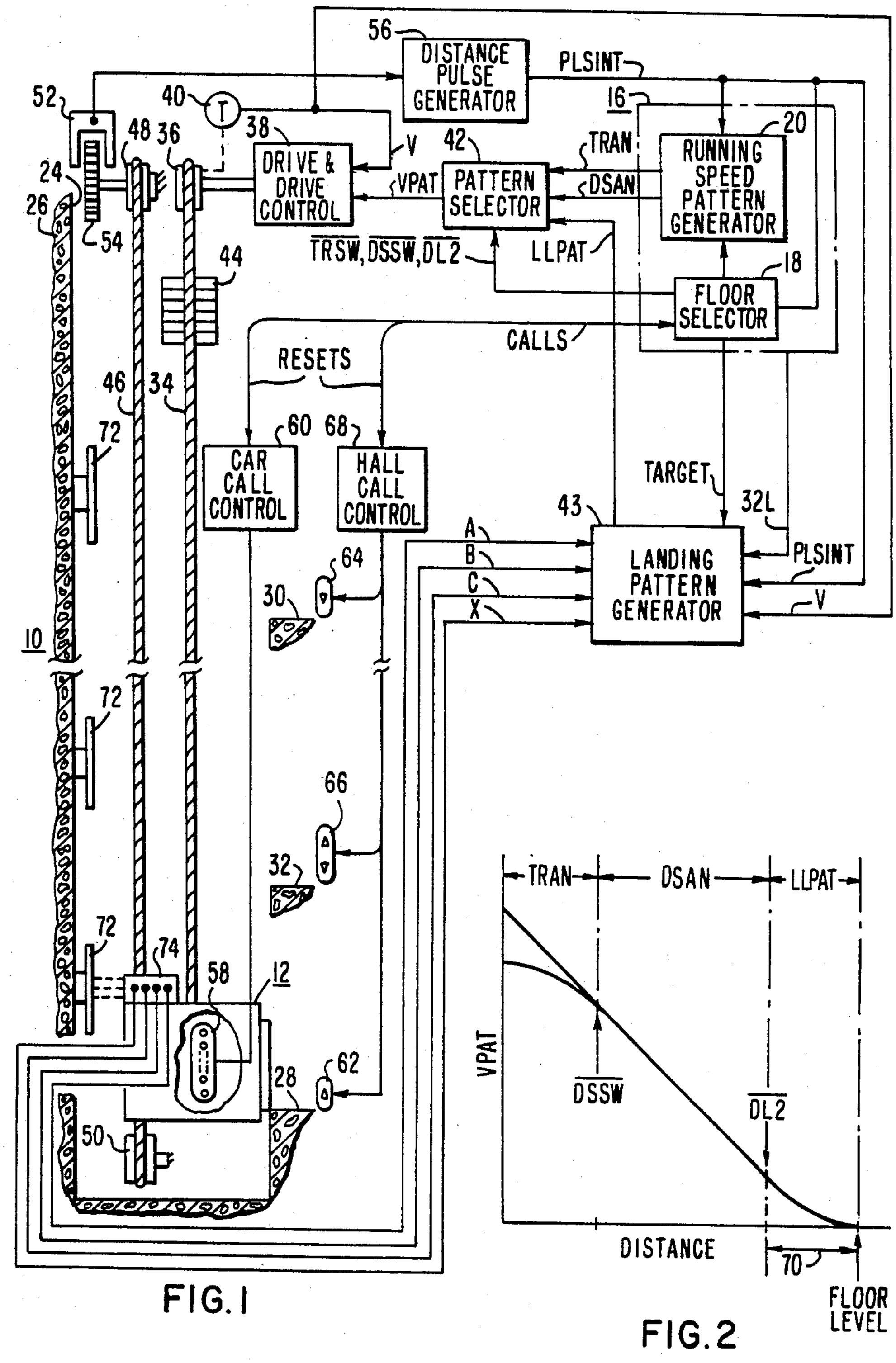
FIG. 1 is a partially schematic and partially block diagram of an elevator system constructed according to the teachings of the invention.
FIG. 2 is a graph illustrating different portions of a speed pattern suitable for an elevator system.

More specifically, FIG. 1 illustrates an elevator system 10 which may have a landing speed pattern generator 43 constructed according to the teachings of the invention. Elevator system 10 includes an elevator car 12 controlled by a car controller 16. Car controller 16 includes a floor selector 18 and a running speed pattern generator 20. Floor selector 18 provides a logic signal TARGET which is true when the next floor at which the elevator car can make a normal stop is the next stop for the car.

Car 12 is mounted in a hatchway 24 for movement relative to a structure 26 having a plurality of floors or landings, with only the bottom floor 28, top floor 30, and one intermediate floor 32 being shown in order to simplify the drawing. Car 12 is supported by a plurality of wire ropes 34 which are reeved over a traction sheave 36 mounted on the shaft of a drive machine 38. The drive machine 38 is the motive means for moving and stopping the elevator car at a target floor. The drive machine 38, along with its associated closed loop feedback control, is shown in detail in incorporated U.S. Pat. No. 4,277,825. A tachometer 40 provides a signal V responsive to the actual rotational speed of the drive motor of the drive machine 38. An error amplifier in the feedback control compares the actual speed signal with the desired speed signal, with the desired speed signal being represented by speed pattern signal VPAT provided by a speed pattern selector function 42. A suitable speed pattern selector function is shown in detail in incorporated U.S. Pat. No. 3,750,850. The speed pattern selector function selects a running speed pattern TRAN, a slowdown speed pattern DSAN and a landing speed pattern LLPAT at the appropriate points of an elevator run. The landing speed pattern LLPAT is provided by the landing speed pattern generator 43, which, as will be hereinafter set forth in detail, is constructed according to the teachings of the invention.

A counterweight 44 is connected to the other ends of the ropes 34. A governor rope 46, which is connected to the car 12, is reeved about a governor sheave 48 and a pulley 50. A pick-up 52 is disposed to detect movement of the elevator car 12 through the effect of circumferentially spaced teeth or openings in the governor sheave 48, or in a separate pulse wheel 54 which is rotated in response to the rotation of the governor sheave 48. The teeth in the pulse wheel 54 are spaced to provide a distance pulse for each predetermined standard increment of travel of the elevator car 12, such as a pulse for each 0.25 inch of car travel. Pick-up 52 is connected to a distance pulse control function 56 which provides distance pulses PLSINT for the car controller 16.

Car calls, such as registered by pushbutton array 58 in the car 12, are processed by car call control 60 and the resulting information is directed to the car controller 16. Hall calls, such as registered by the up pushbutton 62 located at the bottom floor 28, the down pushbutton 64 located at the top floor 30, and the up and down pushbuttons 66 located at the intermediate floors, represented by floor 32, are processed in hall call control 68. The resulting processed hall call information is directed to the car controller 16.

Floor selector 18 tabulates the distance pulses PLSINT in an up/down counter to develop information concerning the precise position of car 12 in the hatchway 24, to the resolution of the standard increment. The floor selector 18, in addition to keeping track of the position of car 12, also tabulates the calls for service, it provides signals for starting the elevator car on a run to serve a call, or calls, and it provides resets for the car and hall call pushbuttons when a call has been served.

Car controller 16 develops an advanced floor position signal for the elevator car 12, referred to as the AVP floor. The AVP floor is the address of the closest floor ahead of the elevator car 12 in its travel direction at which the car can stop according to a predetermined deceleration schedule. The floor at which car 12 should stop, to serve a car call or a hall call, or simply to park, is referred to as the target floor. When the AVP of the car 12 reaches the address of the target floor, the running speed pattern generator, which had been providing a time based speed pattern TRAN, now initiates the slowdown phase of the run by providing a speed pattern DSAN based on the distance-to-go from the elevator car to the target floor. The car controller 16 controls the pattern selector 42 via signals $\overline{\text{TRSW}}$, $\overline{\text{DSSW}}$, and $\overline{\text{DL2}}$, which select the time based running speed pattern TRAN, the slowdown speed pattern DSAN, and the landing speed pattern LLPAT, respectively.

FIG. 2 is a graph which illustrates speed pattern VPAT versus distance-to-go to the target floor, starting at the initiation of the slowdown phase of the run. FIG. 2 also illustrates the high speed tranfer from the time based speed pattern TRAN to the distance based slowdown speed pattern DSAN via a signal $\overline{\text{DSSW}}$, and the low speed pattern transfer from pattern DSAN to the landing speed pattern LLPAT via a signal $\overline{\text{DL2}}$ at a predetermined dimension 70 from the target floor which establishes the landing zone. The predetermined dimension, for example, may be 10 inches (25.4 cm).

According to the teachings of the invention, the predetermined landing zone on each side of each floor level is established by indicia 72 and a detector 74 arranged for relative movement. In a preferred embodiment, indicia 72 is disposed in the hatchway 24 adjacent to each floor served by the elevator car 12, and the indicia 72 is detected by a detector 74 mounted on the elevator car 12. The indicia 72 and detector 74 may be provided by an optical arrangement in which the detector 74 includes suitable transmitters and receivers of electromagnetic radiation, and the indicia 72 includes a predetermined pattern of surfaces which are reflective and non-reflective of such radiation. For example, reflective tape may be used to establish the relective portions of the pattern. The electromagnetic radiation may be of any desired frequency, with infrared light being especially suitable.

Figures 3, 7:
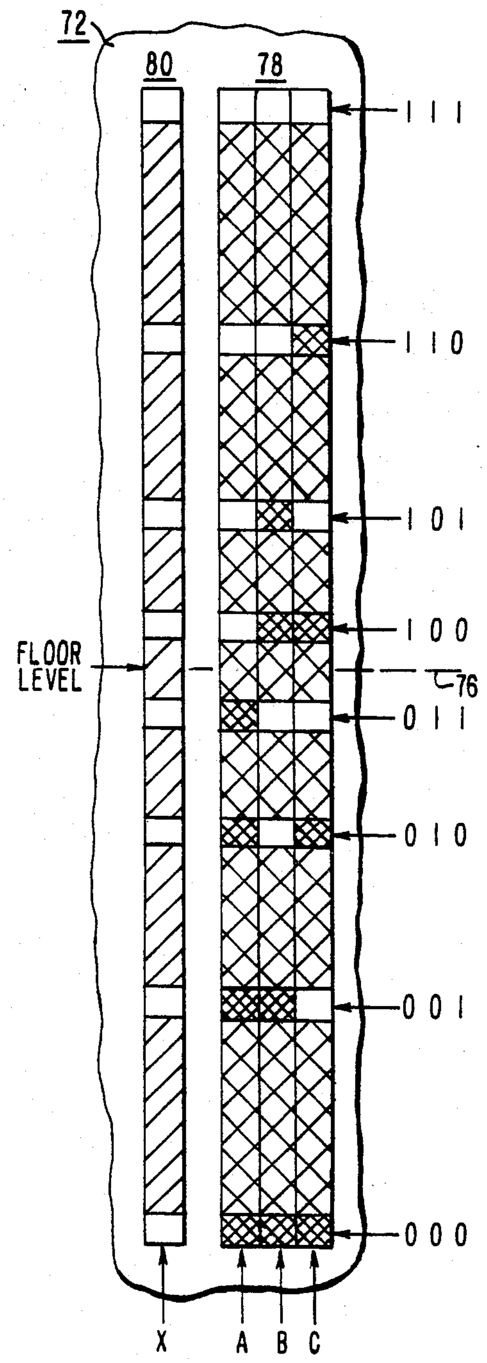
FIG. 3 is an elevational view of indicia suitable for mounting in the hatchway adjacent to each floor, to provide spaced absolute car position points in the landing zone of each floor.
FIG. 7 is a ROM map which illustrates an exemplary format for storing absolute car position points in the read-only-memory (ROM) of FIG. 6.

FIG. 3 illustrates indicia 72 having suitable patterns of reflective and non-reflective surfaces which may be used. The hatched portions of FIG. 3 indicate a non-reflective surface, and the non-hatched portions within the outlines of the patterns indicate reflective surfaces. Indicia 72 is symmetrical above and below floor level, with the floor level being indicated by broken line 76. Indicia 72 includes first and second horizontally spaced, vertically extending patterns 78 and 80, respectively. The first pattern 78 extends for predetermined like vertical dimensions above and below floor level 76, with the predetermined dimension being 10 inches, as hereinbefore set forth.

Pattern 78 defines spaced absolute position points in the landing zone 70 selected to provide exact car to floor distances X(N), for which exact landing pattern values P(N) are developed and stored in a suitable memory. Only a few points are required on each side of floor level 76, with the number of points being selected to minimize the hardware required in the detector 74 in order to recognize each absolute position point. In a preferred embodiment, the pattern 78 defines four absolute position points on each side of floor level, which points may be defined by a three digit binary code and detected by three detector arrangements. The second pattern 80 has a single reflective surface at each absolute car position point, and thus it may be associated with a single detector arrangement. Pattern 80 determines when the three position code detectors should initiate or update their readings. As illustrated in FIG. 3, the binary 000 may be located at the lower end of the landing zone, i.e., below floor level, and the binary 111 may be located at the upper end of the landing zone, which is above floor level. As illustrated, a binary 0 may be represented by a non-reflective surface, and a binary 1 by a reflective surface in the pattern 78. Thus, when the detector for pattern 80 detects a reflective surface adjacent to the target floor, it provides a signal X which causes the detectors associated with pattern 78 to read the three digit binary code and provide a reading ABC.

According to the teachings of the invention, a landing speed pattern value P(N) is provided for each absolute car position point X(N), with values for X(N) and P(N) being stored in a suitable memory, such as in a read-only-memory (ROM). A suitable format for such a memory is set forth in a ROM map in FIG. 7. The values expressed by the binary words for each absolute car position point may represent the values in any desired terms. For example, when the elevator system uses incremental counting of distance pulses PLSINT, with each pulse representing 0.25 inch (0.635 cm) of car travel, the binary words representing distances X(N) may be in terms of a count of 0.25 inch increments. A count of 0010 1000 (decimal 40) would represent 10 inches above floor level, and a count of 1010 1000 would represent 10 inches below floor level, with the MSB being a sign bit which is a "1" for distance values below floor level and a "0" for distance values above floor level.

The stored pattern values P(N) are used for the actual landing pattern when the car is located precisely at the various absolute car positions in the landing zone of the target floor. The landing pattern, however, does not abruptly step from one absolute value to the next, which would provide an unacceptable pattern. From these absolute position (digital) values an analog pattern is generated which smoothly connects the absolute position values. The landing pattern between the absolute position values is based upon the present absolute pattern value P(N), the next absolute pattern value P(S) in the direction of car travel, and the position X(Y) of the elevator car between the last absolute position point X(N) and the next absolute position point X(S). The landing pattern LLPAT between the absolute value speed pattern points is determined by the relationship:

$$LLPAT = P(N) + \frac{P(S) - P(N)}{X(S) - X(N)} (X(Y) - X(N)) \quad (1)$$

The travel distance of the elevator car from the last absolute position point X(N) is given by the term X(Y)-X(N) in equation (1). The travel distance may be determined by integrating the car velocity V with respect to time, as set forth in the following equation:

$$X(Y) = X(N) + \int_{t(N)}^{t} V\,dt \quad (2)$$

Therefore:

$$LLPAT = P(N) + \frac{P(S) - P(N)}{X(S) - X(N)} \int_{t(N)}^{t} V\,dt \quad (3)$$

The phrase $\frac{P(S) - P(N)}{X(S) - X(N)}$ is a constant, which will be referred to as K(N), and thus equation (3) may be written:

$$LLPAT = P(N) + K(N) \int_{t(N)}^{t} V\,dt \quad (4)$$

Figure 4:
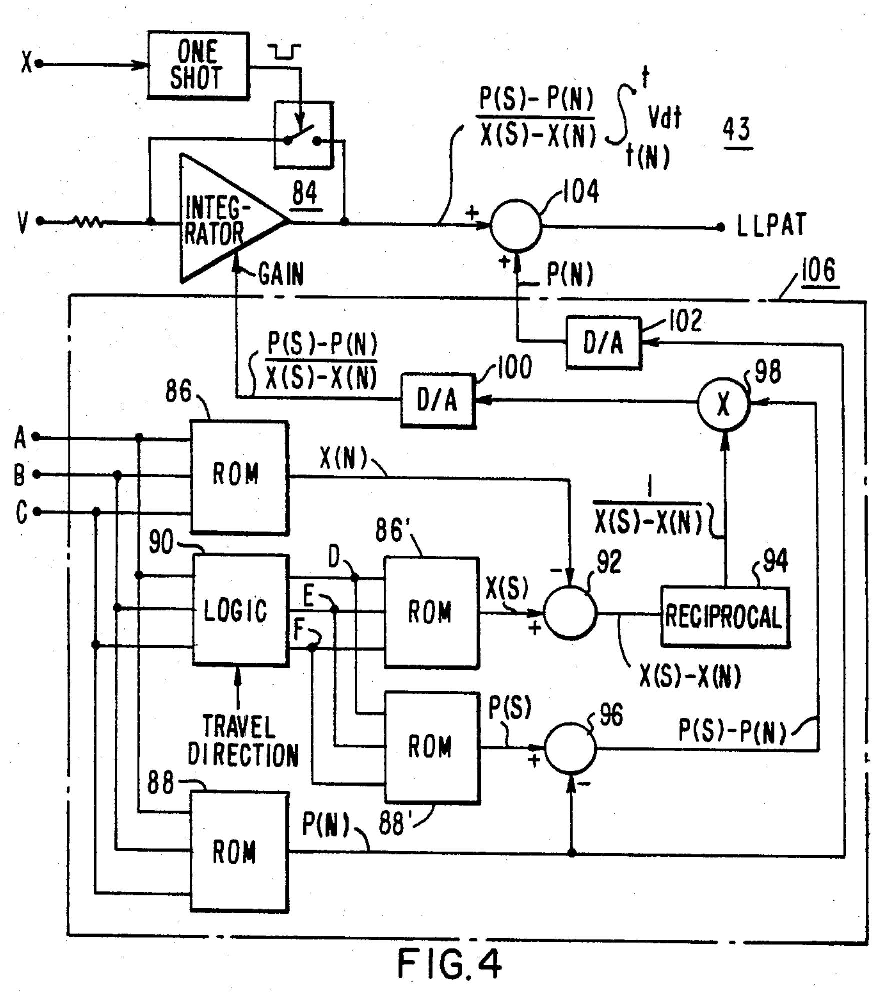
FIG. 4 is a block diagram of a landing speed pattern generator illustrating an exemplary embodiment of the invention.

FIG. 4 is a block diagram of a landing speed pattern generator 43 setting forth an exemplary implementation of the teachings of the invention, in which the car velocity V provided by tachometer 40 is integrated by an analog integrator 84, such as an operational amplifier connected in an integrator configuration. Signal X, which is generated from reflective pattern 80 shown in FIG. 3 resets the integrator 84 at each absolute car position point. The coded absolute car position signals ABC generated from reflective pattern 78 are connected to read-only-memories 86 and 88 to provide the present absolute car position X(N) and the speed pattern P(N) associated with this point, respectively. Suitable formats for ROMS 86 and 88 are shown in FIG. 7. The signals ABC are also applied to logic function 90 which adds a "1" to the binary number ABC when the car is traveling upwardly, and subtracts a "1" from the binary number ABC when the car is traveling downwardly. The travel direction signal, for example, may be obtained from the polarity of the car velocity V, with a positive polarity indicating up travel and a negative polarity indicating down travel, for example. The output of logic function 90 is binary signal DEF which indicates the next absolute car position which will be reached by the elevator car. Signals DEF are applied to ROMS 86' and 88' which are similar to ROMS 86 and 88, respectively. ROM 86' outputs the next absolute car position X(S) and ROM 88' outputs the pattern value P(S) for this next absolute car position.

A binary subtractor function 92 combines the outputs of ROMS 86 and 86' to provide the term X(S)−X(N) and a divider or reciprocal function 94 provides the reciprocal $$\frac{1}{X(S) - X(N)}.$$

A binary subtractor function 96 combines the outputs of ROMS 88' and 88 to provide the term P(S)−P(N), and a multiplication function 98 multiplies the outputs of functions 92 and 96 to provide the term $$\frac{P(S) - P(N)}{X(S) - X(N)}.$$

This term may be converted to analog form via a digital to analog converter 100, with the output controlling the gain of the integrator function 84. Thus, the output of integrator 84 is equal to:

$$\frac{P(S) - P(N)}{X(S) - X(N)} \int_{t(N)}^{t} V\,dt$$

The output P(N) of ROM 88 is applied to D/A 102 and an adder function 104 combines the outputs of the integrator 84 and D/A 102 to provide the landing pattern LLPAT as set forth in equation (3).

Figure 5:
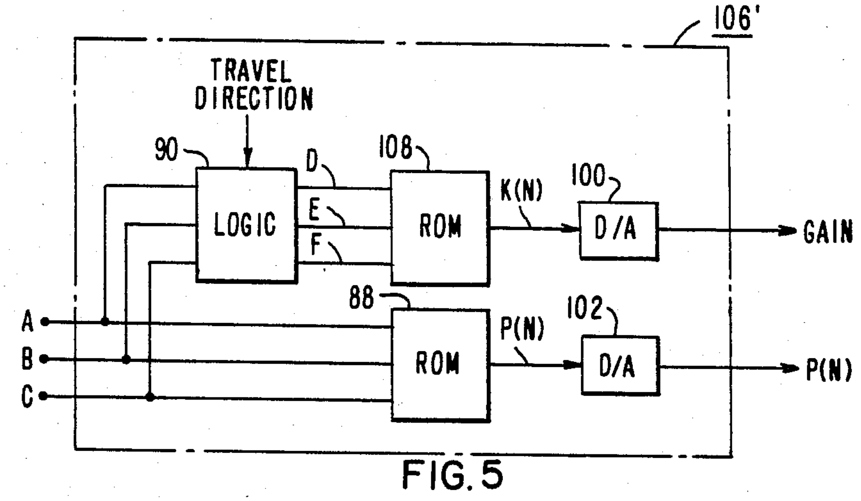
FIG. 5 illustrates a modification of the speed pattern generator shown in FIG. 4.

Since the term $$\frac{P(S) - P(N)}{X(S) - X(N)}$$

is a constant K(N), and may be calculated in advance and stored in a ROM, the portion of the landing speed pattern generator 82 shown within the broken outline 106 of FIG. 4 may be replaced by the hardware shown within the broken outline 106' in FIG. 5. The constant K(N) is stored in a ROM 108. Thus, only logic function 90, ROM 108 and D/A 100 are required to provide the gain signal for integrator 84, with ROM 88 and D/A 102 providing signal P(N), as in the FIG. 4 embodiment. The FIG. 5 embodiment provides the landing pattern LLPAT as set forth in equation (4).

Figure 6:
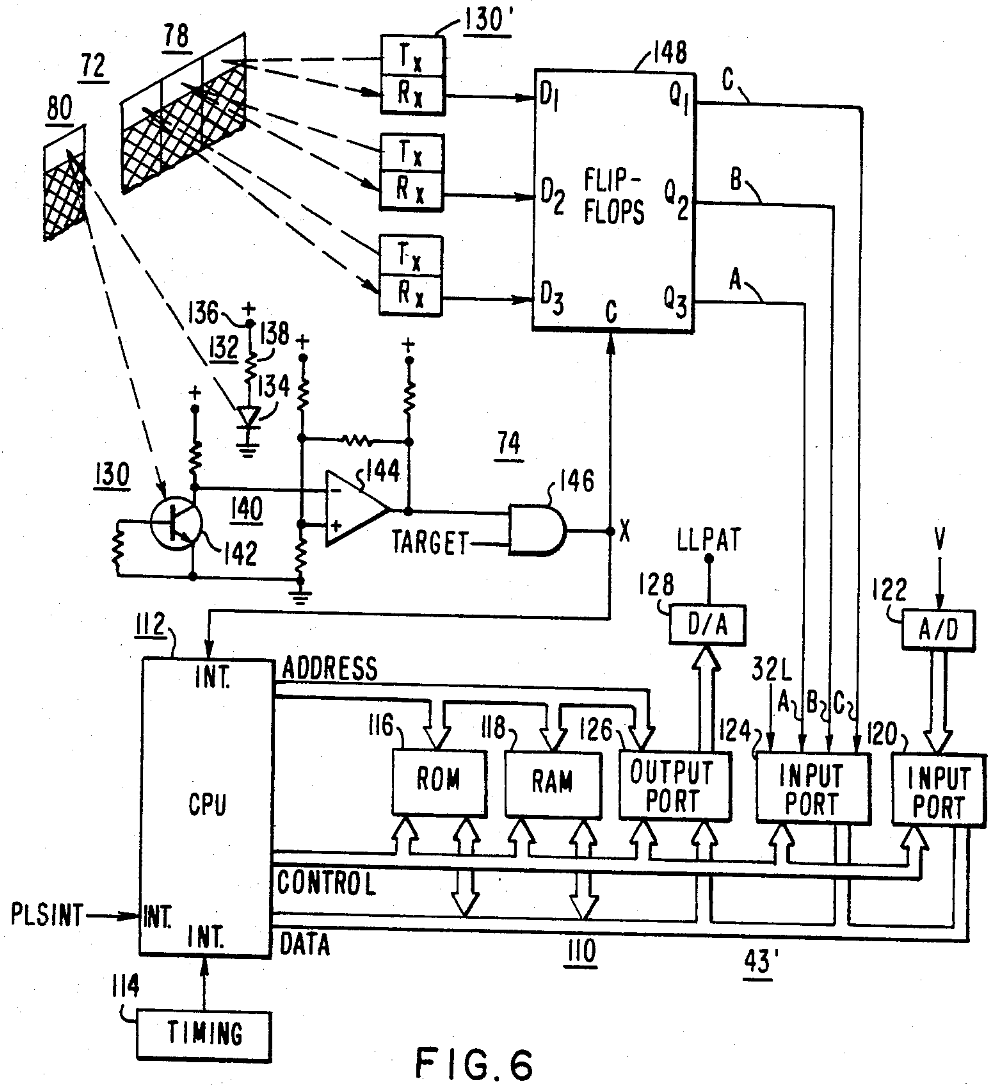
FIG. 6 is a partially schematic and partially block diagram illustrating a speed pattern generator constructed according to a preferred embodiment of the invention.

While the division, addition, subtraction and integrating functions of FIGS. 4 and 5 may be achieved with analog or digital devices, in a preferred embodiment of the invention, the various functions required to provide the landing speed pattern LLPAT are performed by a microcomputer 110 in a landing speed pattern generator 43' set forth in FIG. 6.

Microcomputer 110 includes a central processing unit (CPU) 112, a timing function 114, a read-only-memory (ROM) 116, a random access memory (RAM) 118, an input port 120, an analog-to-digital converter (A/D) 122 for receiving the car velocity signal V, an input port 124 for receiving the absolute car position signals ABC and the running signal 32L, an output port 126, and a digital-to-analog converter (D/A) 128 for providing the landing speed pattern LLPAT.

The detector 74 which detects the reflective surfaces of the patterns 78 and 80 includes a source or transmitter of electromagnetic radiation, and an associated detector or receiver thereof, for each of the four vertical lanes. For example, the vertical lane of target 80 may be detected by a detector arrangement 130 which includes a transmitter 132 of electromagnetic radiation, such as an LED 134 electrically energized via a source 136 of unidirectional potential and a resistor 138. Detector 130 further includes a receiver 140 of the electromagnetic radiation, such as a phototransistor 142 and an operational amplifier 144 connected as a voltage level detector. In order to provide a true output signal X only when the elevator car is in the process of landing at a target floor, the signal TARGET from the floor selector 18, or any other suitable signal, is AND'ed with the output of op. amp. 144 in an AND gate 146. Thus, when a reflective surface of pattern 80 is detected adjacent to the target floor, AND gate 146 outputs a true signal X.

Figure 8:
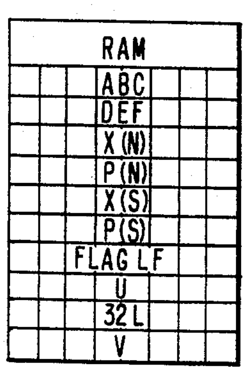
FIG. 8 is a RAM map which illustrates the flags, data, and other information stored in the random-access-memory (RAM) of FIG. 6.

The three vertical lanes of pattern 78 may be detected by arrangements similar to the detector arrangement 130, and they are thus shown in block form with a reference 130'. Absolute car position signals ABC may be provided by three D-type flip-flops, shown generally at 148, with signal X clocking the flip-flops to transfer the logic level at their D inputs to their Q outputs, and thus memorize the absolute position reading until the next absolute car position is reached. Signal X may also be tied to an interrupt input of CPU 112, so input port 124 may be read to determine the latest absolute position signals ABC, which are stored in RAM 118. FIG. 8 illustrates a RAM map, setting forth a suitable format for the data, signals and flags stored in RAM 118 from time to time during the running of the landing speed pattern programs shown in FIGS. 9 and 10.

Figure 9:
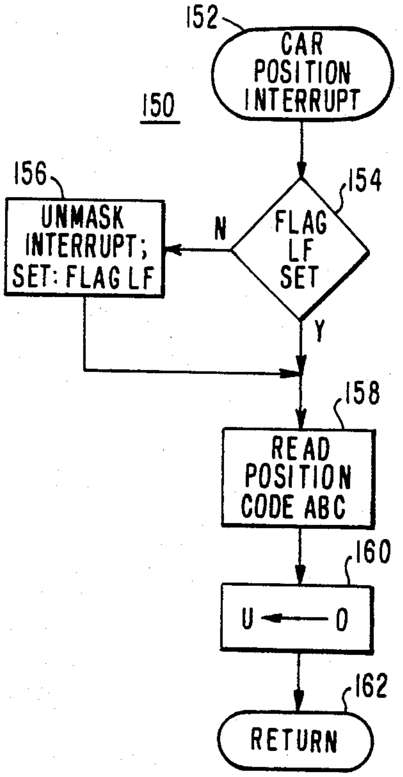
FIG. 9 is a flow chart of a car position interrupt program stored in the ROM of FIG. 6, which is run each time the elevator car reaches a new absolute position in the landing zone of a target floor.
Figure 10:
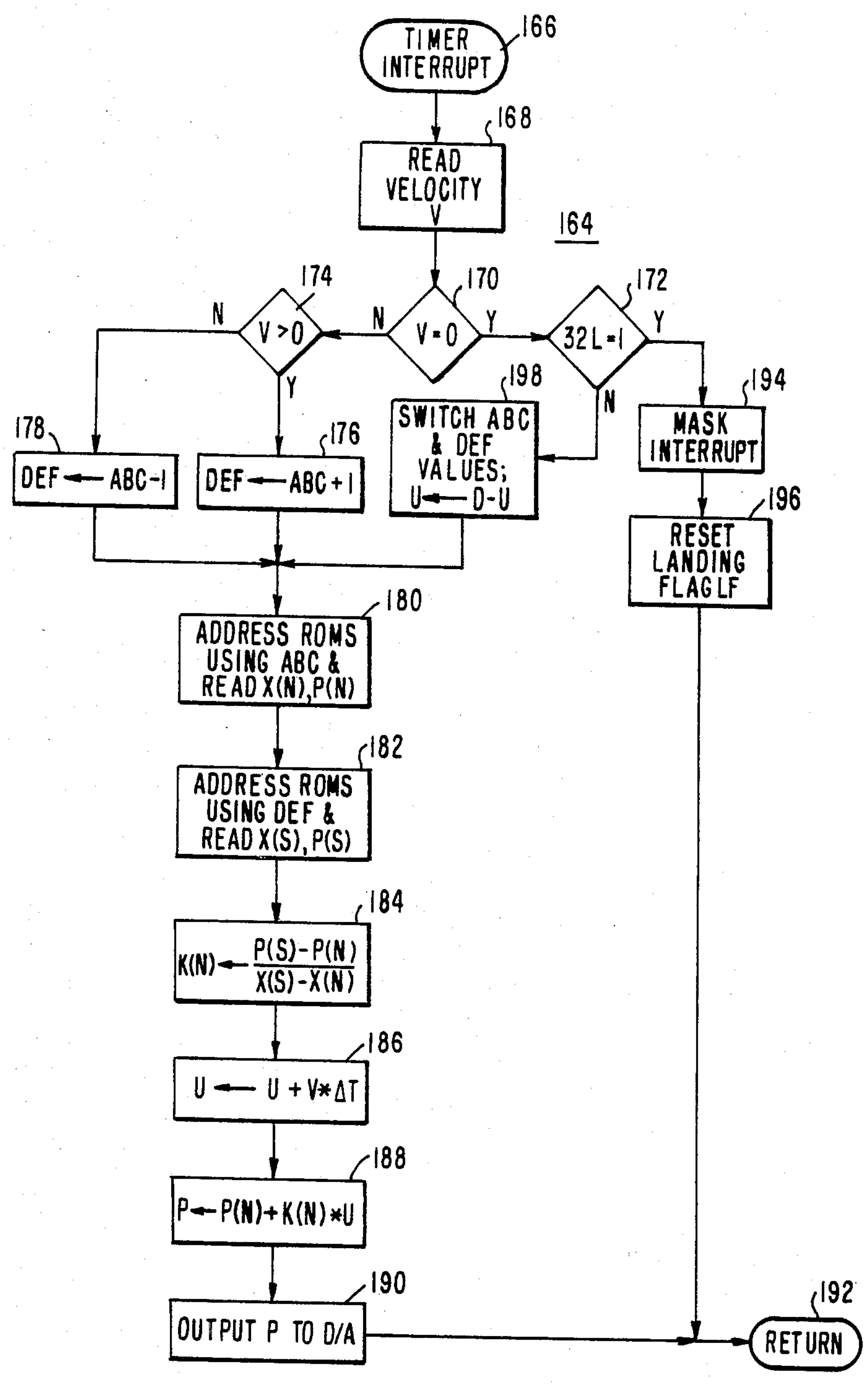
FIG. 10 is a flow chart of a timer interrupt program stored in the ROM of FIG. 6, which is run periodically while the elevator car is in the landing zone of a target floor.

FIG. 9 is a flow chart of a car position interrupt program 150 which may be stored in ROM 116 and run in response to signal X. Program 150 is entered at address 152 each time signal X goes true, and step 154 checks to see if a landing flag LF has been set. Flag LF is used to determine if the signal X being received is the initial detection of pattern 80. If it is, step 154 will find flag LF is not set and step 156 unmasks the interrupt input to CPU 112 which will initiate the program 164 shown in FIG. 10. Program 164, as shown in FIG. 10, may be a time interrupt driven program, or as shown in the modification of program 164 set forth in FIG. 11, it may be distance pulse (PLSINT) driven. Step 156 also sets flag LF so step 154 on the next interrupt will skip step 156.

Step 156 advances to step 158, which reads signals ABC at input port 124 and stores them in RAM 118. Step 154 also advances to step 158 on subsequent interrupts.

Step 160 sets a value U to zero and the program exits at 162. The value U represents the distance the car has travelled since the last absolute car position point, and thus, the value of U is zeroed at each X interrupt.

Digital integration of car velocity V may be accomplished by detecting car velocity V at spaced short uniform time intervals, such as every 20 MSEC, by multiplying the car velocity by the time interval, and by adding the incremental result to the sum of any prior such increments. Program 164 is based on this concept, with a timer interrupt from timing function 114 causing program 164 to be entered at address 166. Step 168 reads the car's velocity V and step 170 checks to see if it is zero. It may be zero because the car has completed its run and is stopped at floor level, or because the car has overshot floor level and is in the process of reversing direction to return to floor level. If step 170 finds V equal to zero, a logic signal 32L responsive to a running relay which drops out at the end of the run may be checked in step 172, or any other suitable signal may be checked to determine if the run has been completed. It will be assumed at this point that signal V is not zero, with step 170 advancing to step 174.

Step 174 checks the car's travel direction, such as by checking the polarity of the car velocity signal V. If the velocity is greater than zero, i.e., positive, the car is traveling upwardly and step 176 generates the binary code DEF for the next absolute car position by adding "1" to the binary number ABC which identifies the last absolute car position point passed by the car. If V is not greater than 0, it must be less than 0, i.e., negative, indicating dowm travel, and step 174 proceeds to step 178 which forms DEF by subtracting "1" from ABC.

Step 180 addresses the two tables stored in ROM 116 using ABC as the address, with the formats of these tables being set forth in FIG. 7. Step 180 thus reads and stores the location X(N) and the associated pattern value P(N). Step 182 addresses the same two tables in ROM 116 using DEF as the address, with step 182 reading and storing the location X(S) and the associated pattern P(S). Step 184 then calculates K(N) using the values obtained in steps 180 and 182.

Step 186 updates the distance traveled U by the elevator car since the last absolute car position point by multiplying the car velocity V by the time increment, which is 20 MSEC in the present example. The product is added to the previous value of U and stored at a location U in the RAM map of FIG. 8. Step 188 multiplies U by K(N) and adds the result to P(N) to obtain the digital value of the landing speed pattern. Step 190 outputs the result P to the D/A 128, which provides the landing pattern LLPAT in analog form, and the program returns to the priority executive at 192.

When step 170 finds the car velocity to be zero, it checks step 172 to see if the run has been completed. If it has, step 194 masks the interrupt unmasked by step 156 of FIG. 9, step 196 resets flag LF, and the program exits at 192.

If step 170 finds the car velocity to be zero, step 172 finds the run has not been completed, the car has overshot the floor. Thus, the values of ABC and DEF should be exchanged, and the present value of U should be subtracted from the distance V between the points represented by ABC and DEF. This is accomplished in step 198, and step 198 proceeds to step 180, hereinbefore described.

Figure 11:
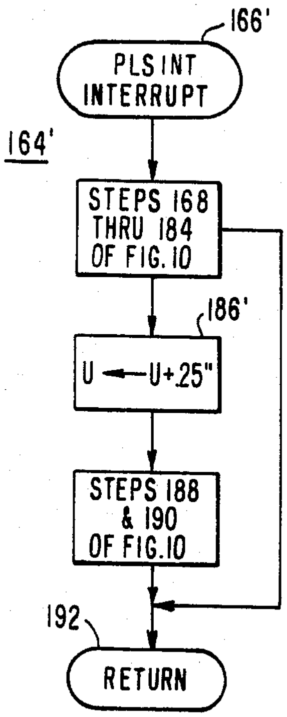
FIG. 11 is a flow chart which illustrates how the program of FIG. 10 may be modified to be interrupted by distance pulses from a pulse wheel, instead of being time interrupt based.

If the elevator system generates distance pulses PLSINT, the program of FIG. 10 may be distance pulse driven, rather than timer driven, with FIG. 11 illustrating this embodiment of the invention. When a pulse interrupt is received by CPU 112, the interrupt driven program is entered at 166'. Steps 168 through 184 of the program at FIG. 10 are then followed until reaching step 186', in which the present value of U is incremented by 0.25 inch, and the result stored at location U of the RAM map of FIG. 8. Step 186' then proceeds to steps 188 and 190 of FIG. 10, and the program exits at 192.

Figure 12:
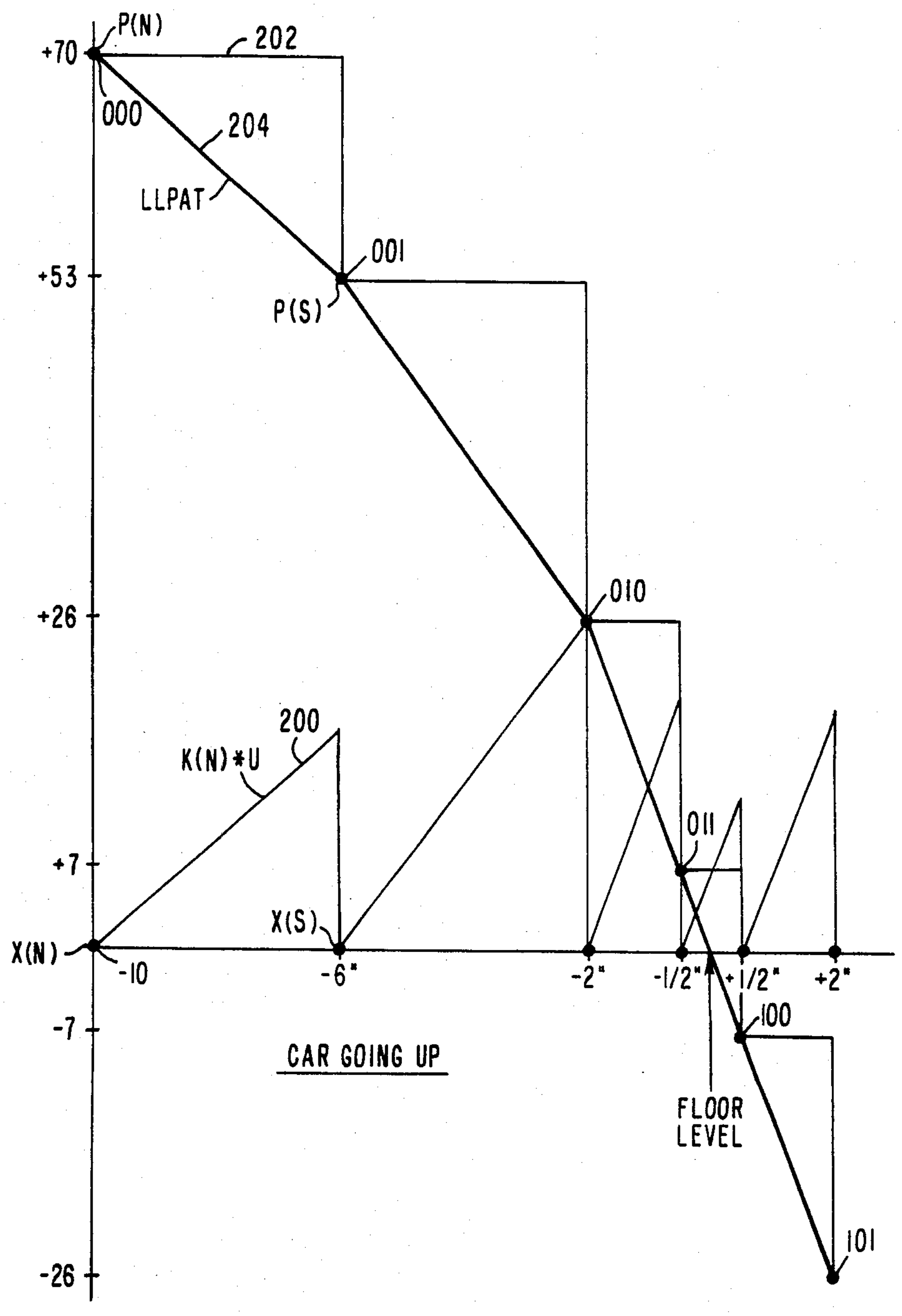
FIG. 12 is a graph which illustrates the generation of a landing speed pattern according to the teachings of the invention, for an upwardly traveling elevator car.

FIG. 12 is a graph which illustrates how the landing pattern LLPAT is generated by program 164 for an upwardly traveling elevator car. When the landing zone is first detected, i.e., ABC is equal to 000, X(N) is equal to 10 inches and the associated pattern P(N) is +70 units, with the pattern being positive for comparison with the positive tach voltage V. The units are related to voltage via a predetermined conversion constant. X(S) will thus be six inches, in the present example, and the associated pattern P(S) will be equal to 53 units. The value of K(N) multiplied by U increases in a positive direction from zero at the 10 inch point along a ramp 200, and it is subtracted from the positive value of P(N), indicated by horizontal line 202, to form a segment 204 of the speed pattern LLPAT which smoothly diminishes in value from P(N) to P(S). Each subsequent segment of pattern LLPAT is formed in the same manner until the pattern reaches zero. If the upwardly traveling car should overshoot the floor, the pattern will go negative to reverse the car travel direction and return the car to floor level.

Figure 13:
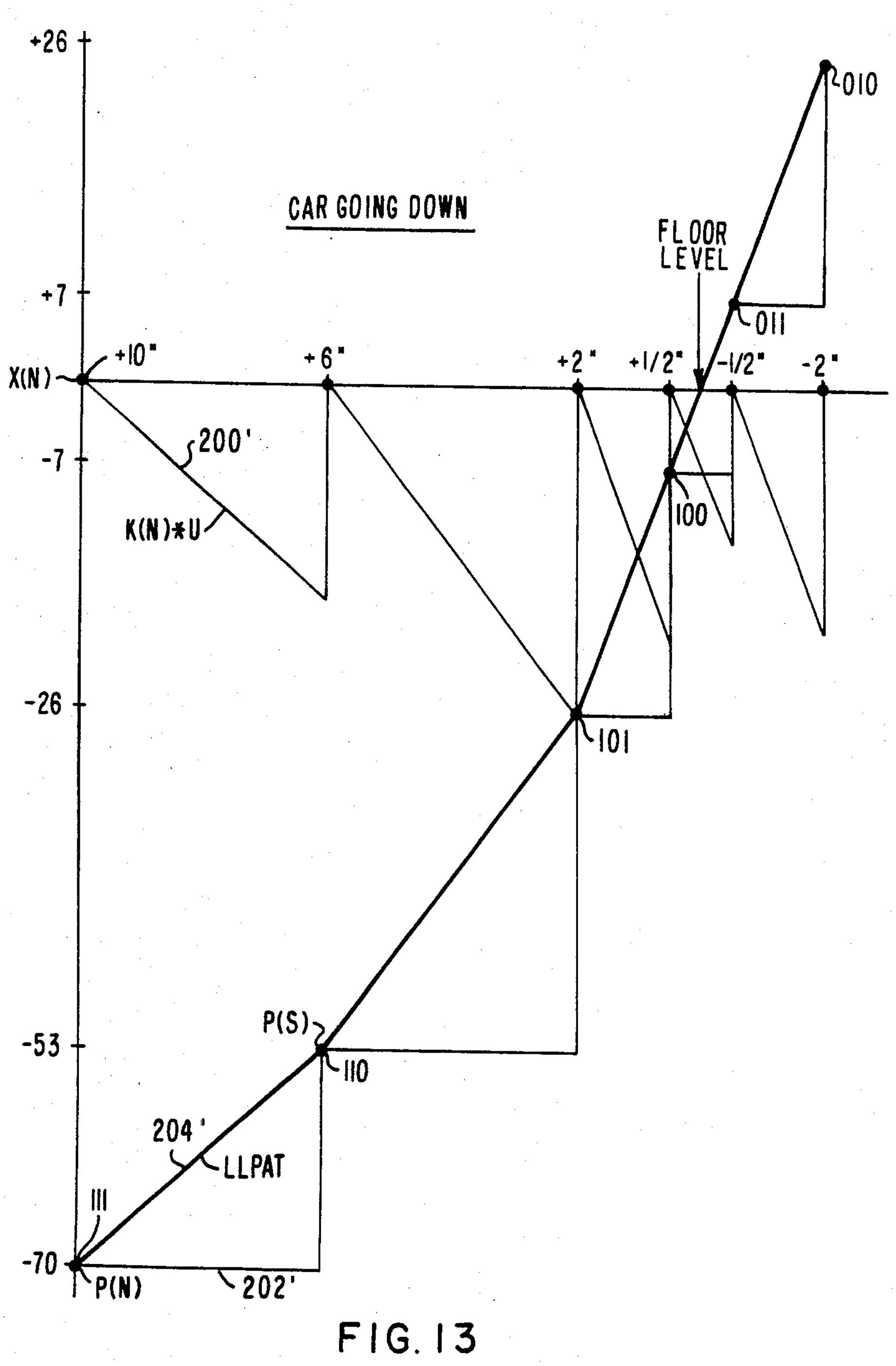
FIG. 13 is a graph, similar to the graph of FIG. 12 except illustrating the generation of a landing speed pattern for a downwardly traveling elevator car.

FIG. 13 is a graph which is similar to that of FIG. 12, except for a downwardly traveling elevator car. When the car initially encounters the landing zone, ABC will be equal to 111, X(N) will be equal to 10 inches and the pattern P(N) will be −70 units, with the polarity being negative for comparison with the negative tach voltage V. The term K(N) multiplied by U will decrease from zero along line 200', which is subtracted from the value of P(N), represented by the horizontal line 202', to form segment 204' which smoothly interconnects the absolute pattern points P(N) and P(S). If the downwardly traveling elevator car should overshoot the floor, the pattern will automatically go through zero and become positive in order to reverse the car's travel direction and cause it to travel upwardly, back to the floor level.

I claim as my invention:

1. An elevator system, comprising:
- a building having a plurality of floors and a hatchway,
- an elevator car mounted for movement in the hatchway of said building to serve the floors,
- motive means for said elevator car,
- landing zone means mounted in the hatchway of said building to establish a landing zone adjacent to each floor served by said elevator car,
- landing zone detector means mounted on said elevator car,
- said landing zone means and said landing zone detector means cooperatively detecting the position of said elevator car as the elevator car approaches a floor at which it is going to stop,
- said landing zone means establishing spaced absolute car position points in each landing zone,
- said landing zone detector means detecting each of said spaced absolute car position points and providing a predetermined absolute car position signal in response thereto,
- storage means storing a discrete landing speed pattern value for each absolute car position point of said landing zone means,
- said means providing a landing speed pattern for said motive means,
- said landing speed pattern including a discrete landing speed pattern value obtained from said storage means in response to the generation of each predetermined absolute car position signal,
- said discrete landing speed value being modified by additional landing speed pattern values provided in the interval between the generation of successive absolute car position signals,
- said additional landing speed values being generated as a function of the latest discrete landing speed pattern value, the next discrete landing speed pattern value, and the distance traveled by the elevator car between the latest and the next absolute car position points.

2. The elevator system of claim 1 including means providing a velocity signal responsive to the speed of the elevator car, and wherein the means providing the landing speed pattern includes means for integrating the velocity signal to obtain the distance traveled by the elevator car between the latest and next absolute car position points.

3. The elevator system of claim 1 wherein the landing zone means includes a digital code which establishes the spaced absolute car position points, and the storage means storing the landing speed pattern value includes a read-only-memory addressable by the digital code.

4. The elevator system of claim 3 wherein the landing zone means includes a landing zone which extends for a predetermined dimension on each side of each floor, and the digittal code starts at one end of each landing zone and extends through floor level to the other end of the landing zone.

5. The elevator system of claim 4 wherein the stored landing speed pattern values have a predetermined like polarity for absolute car position points below floor level, and the opposite polarity for absolute car position points above floor level.

6. Th elevator system of claim 2 wherein the means integrating the velocity signal includes means for multiplying the velocity signal by predetermined increments of time, to provide incremental travel distances, and means for adding the incremental distances.

7. The elevator system of claim 1 including means providing a distance pulse for each predetermined standard increment of car travel, and wherein the means providing the landing speed pattern includes means for adding the predetermined standard increments as each distance pulse is received, to obtain the distance traveled by the elevator car between the latest and next absolute car position points.

8. The elevator system of claim 1 wherein the means providing the landing speed signal provides the stored speed pattern values at each absolute car position point, and between each such point modifies the latest stored speed pattern value in response to the distance traveled by the elevator car since the last absolute position point multiplied by a constant related to the difference between the landing speed pattern values at the latest absolute position point and the next absolute position point divided by the distance between the latest absolute position point and the next absolute position point.

* * * * *